United States Patent
Koge et al.

(10) Patent No.: US 9,528,713 B2
(45) Date of Patent: Dec. 27, 2016

(54) COMBINED HOT WATER SUPPLY AND AIR-CONDITIONING DEVICE

(75) Inventors: Hirofumi Koge, Tokyo (JP); Tomokazu Kawagoe, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 541 days.

(21) Appl. No.: 13/881,458

(22) PCT Filed: Dec. 22, 2010

(86) PCT No.: PCT/JP2010/007434
§ 371 (c)(1),
(2), (4) Date: Apr. 25, 2013

(87) PCT Pub. No.: WO2012/085970
PCT Pub. Date: Jun. 28, 2012

(65) Prior Publication Data
US 2013/0219945 A1    Aug. 29, 2013

(51) Int. Cl.
*F24F 5/00* (2006.01)
*F24H 4/02* (2006.01)
*F25B 30/02* (2006.01)
*F25B 13/00* (2006.01)
*F25B 7/00* (2006.01)
*F24F 3/06* (2006.01)
*F24H 6/00* (2006.01)
*F24D 15/04* (2006.01)
*F24D 19/10* (2006.01)
*F24D 3/08* (2006.01)

(52) U.S. Cl.
CPC .............. *F24F 5/00* (2013.01); *F24D 15/04* (2013.01); *F24D 19/1054* (2013.01); *F24F 3/06* (2013.01); *F24F 5/0017* (2013.01); *F24H 4/02* (2013.01); *F24H 6/00* (2013.01); *F25B 7/00* (2013.01); *F25B 13/00* (2013.01); *F25B 30/02* (2013.01); *F24D 3/08* (2013.01);
(Continued)

(58) Field of Classification Search
CPC ..... F25B 2313/003; F25B 30/02; F25B 13/00; F24H 4/02; F24F 5/00
USPC .................... 62/238.7, 238.6, 324.6
See application file for complete search history.

(56) References Cited

U.S. PATENT DOCUMENTS 2,244,551 A * 6/1941 Crawford .............. F24F 3/0525
165/222
2,260,477 A * 10/1941 Newton .................... F24F 3/14
165/228
(Continued)

FOREIGN PATENT DOCUMENTS

EP    2 233 864 A1    9/2010
GB      2273763 A *   6/1994    ................ F25B 7/00
(Continued)

OTHER PUBLICATIONS

Office Action dated Aug. 29, 2014 issued in corresponding CN patent application No. 201080070358.1 (and English translation).
(Continued)

*Primary Examiner* — Marc Norman
*Assistant Examiner* — Kristin Oswald
(74) *Attorney, Agent, or Firm* — Posz Law Group, PLC

(57) ABSTRACT

A combined hot water supply and air-conditioning device heat source even in a case where the outside air temperature is high such as in summertime. In heating operation, a combined hot water supply and air-conditioning device controls the capacity of a heat source unit-side heat exchanger equipped to a heat source unit to thereby achieve a balance between the load of the heat source unit, and the total load of indoor units and a hot water supply unit.

8 Claims, 5 Drawing Sheets

(52) U.S. Cl.
CPC .. *F24D 2200/123* (2013.01); *F25B 2313/003* (2013.01); *F25B 2313/0231* (2013.01); *F25B 2313/0252* (2013.01); *F25B 2313/02741* (2013.01); *Y02B 30/12* (2013.01); *Y02E 60/147* (2013.01)

(56) References Cited

U.S. PATENT DOCUMENTS

| | | | | |
|---|---|---|---|---|
| 3,837,174 A * | 9/1974 | Miyagi | F25B 15/008 | 165/63 |
| 4,062,489 A * | 12/1977 | Henderson | F24D 11/0221 | 165/236 |
| 4,196,595 A * | 4/1980 | Shaw | F04C 18/16 | 237/2 B |
| 4,209,996 A * | 7/1980 | Shaw | F24D 11/0221 | 237/2 B |
| 4,253,153 A * | 2/1981 | Bitterli | F24F 3/153 | 165/215 |
| 4,326,387 A * | 4/1982 | Friedman | F25B 1/00 | 200/83 T |
| 4,420,947 A * | 12/1983 | Yoshino | F24D 11/0264 | 126/585 |
| 4,458,498 A * | 7/1984 | Kajino | F25B 30/06 | 165/240 |
| 4,592,206 A * | 6/1986 | Yamazaki | F24D 15/04 | 62/160 |
| 4,635,445 A * | 1/1987 | Otsuka | F24F 3/0442 | 165/217 |
| 4,644,756 A * | 2/1987 | Sugimoto | F24F 3/065 | 62/160 |
| 4,676,072 A * | 6/1987 | Higuchi | F25B 1/00 | 62/175 |
| 4,697,434 A * | 10/1987 | Yuyama | F24F 5/0096 | 237/2 B |
| 4,720,982 A * | 1/1988 | Shimizu | F25B 5/00 | 165/205 |
| 4,727,727 A * | 3/1988 | Reedy | F24D 17/02 | 62/238.6 |
| 4,787,211 A * | 11/1988 | Shaw | F25B 1/10 | 417/248 |
| 4,796,439 A * | 1/1989 | Yamada | F24D 11/0214 | 62/159 |
| 4,819,587 A * | 4/1989 | Tsutsui | F23N 1/082 | 122/14.2 |
| 4,878,357 A * | 11/1989 | Sekigami | F24F 3/065 | 62/160 |
| 5,050,394 A * | 9/1991 | Dudley | F24D 17/02 | 62/115 |
| 5,095,712 A * | 3/1992 | Narreau | F25B 1/10 | 62/113 |
| 5,095,715 A * | 3/1992 | Dudley | F24D 17/02 | 237/2 B |
| 5,161,739 A * | 11/1992 | Saito | F24D 7/00 | 237/67 |
| 5,272,885 A * | 12/1993 | Watanabe | F24F 3/06 | 62/184 |
| 5,305,614 A * | 4/1994 | Gilles | F24F 5/0096 | 62/238.7 |
| 5,313,804 A * | 5/1994 | Kaye | F24J 3/08 | 62/160 |
| 5,351,502 A * | 10/1994 | Gilles | F24F 5/0096 | 62/238.7 |
| 5,381,671 A * | 1/1995 | Saito | F24F 3/065 | 62/430 |
| 5,417,076 A * | 5/1995 | Vaynberg | F25B 49/022 | 62/174 |
| 5,718,628 A * | 2/1998 | Nakazato | F24F 3/044 | 236/49.5 |
| 5,743,110 A * | 4/1998 | Laude-Bousquet | F25B 1/00 | 165/218 |
| 5,947,373 A * | 9/1999 | Saito | F24F 1/0003 | 165/240 |
| 6,062,035 A * | 5/2000 | Ueno | F24F 5/0017 | 62/324.1 |
| 6,446,448 B1 * | 9/2002 | Wang | F28F 27/003 | 62/183 |
| 6,557,361 B1 * | 5/2003 | Howard | F25B 7/00 | 62/175 |
| 6,668,572 B1 * | 12/2003 | Seo | F24D 17/02 | 237/2 B |
| 7,640,763 B2 * | 1/2010 | Nishimura | F24D 17/02 | 62/238.6 |
| 7,855,890 B2 * | 12/2010 | Kashirajima | F25B 25/00 | 361/679.46 |
| 8,657,207 B2 * | 2/2014 | Back | F24D 11/0214 | 237/2 B |
| 2002/0002834 A1 * | 1/2002 | Kuroki | F24D 19/1054 | 62/238.6 |
| 2002/0023442 A1 * | 2/2002 | Arita | F24F 3/06 | 62/148 |
| 2003/0010047 A1 * | 1/2003 | Shimoda | F25B 13/00 | 62/228.3 |
| 2003/0121271 A1 * | 7/2003 | Dinnage | F24F 3/1405 | 62/94 |
| 2004/0107710 A1 * | 6/2004 | Lee | F24F 11/008 | 62/175 |
| 2005/0066678 A1 * | 3/2005 | Kamimura | F25B 29/003 | 62/238.7 |
| 2005/0252226 A1 * | 11/2005 | Seefeldt | F24D 3/12 | 62/238.7 |
| 2006/0218948 A1 * | 10/2006 | Otake | F25B 9/008 | 62/160 |
| 2006/0242977 A1 * | 11/2006 | Cho | F25B 13/00 | 62/238.7 |
| 2007/0246555 A1 * | 10/2007 | Nishimura | F24D 3/08 | 237/2 B |
| 2008/0022708 A1 * | 1/2008 | Cho | F25B 13/00 | 62/238.7 |
| 2008/0023961 A1 * | 1/2008 | Cho | F25B 27/02 | 290/2 |
| 2008/0023962 A1 * | 1/2008 | Cho | B60H 1/00421 | 290/2 |
| 2009/0113911 A1 * | 5/2009 | Nakayama | F24D 17/02 | 62/238.6 |
| 2009/0151377 A1 * | 6/2009 | Yonemori | F25B 49/02 | 62/203 |
| 2009/0158761 A1 * | 6/2009 | Wakamoto | F25B 7/00 | 62/175 |
| 2009/0211282 A1 * | 8/2009 | Nishimura | F24D 17/02 | 62/238.6 |
| 2010/0031953 A1 * | 2/2010 | Penev | F24D 17/0021 | 126/615 |
| 2010/0050675 A1 * | 3/2010 | Kameyama | F24D 17/001 | 62/238.7 |
| 2010/0282434 A1 | 11/2010 | Yabuuchi et al. | | |
| 2010/0282435 A1 | 11/2010 | Yabuuchi et al. | | |
| 2010/0287964 A1 * | 11/2010 | Okamoto | F24D 11/0214 | 62/224 |
| 2010/0319377 A1 * | 12/2010 | Moriwaki | C09K 5/045 | 62/238.6 |
| 2011/0030405 A1 * | 2/2011 | Ueda | F25B 29/003 | 62/238.7 |
| 2011/0302947 A1 * | 12/2011 | Honda | F24D 3/02 | 62/324.6 |

FOREIGN PATENT DOCUMENTS

| | | | |
|---|---|---|---|
| JP | 02-103352 A | 4/1990 | |
| JP | 04-263758 A | 9/1992 | |
| JP | 05-149648 A | 6/1993 | |
| JP | 11-270920 A | 10/1999 | |
| JP | 2006-283989 A | 10/2006 | |
| WO | WO 2008117408 A1 * | 10/2008 | F24D 17/001 |
| WO | 2009/122476 A1 | 10/2009 | |

(56) References Cited

FOREIGN PATENT DOCUMENTS

WO      2010/098070 A1    9/2010
WO   WO 2010098070 A1 *  9/2010   .............. F25B 13/00

OTHER PUBLICATIONS

International Search Report of the International Searching Authority mailed Mar. 1, 2011 for the corresponding international application No. PCT/JP2010/007434 (with English translation).
Office Action mailed Apr. 14, 2015 in the corresponding CN application No. 2010800703581 (with English translation).
Extended European Search Report dated Jun. 2, 2014 issued in corresponding EP patent application No. 10861171.6.
Office Action issued on Feb. 18, 2014 for corresponding Japanese Patent Application No. 2012-549480 (with English translation).

* cited by examiner

US 9,528,713 B2

COMBINED HOT WATER SUPPLY AND AIR-CONDITIONING DEVICE

CROSS REFERENCE TO RELATED APPLICATION

This application is a U.S. national stage application of International Application No. PCT/JP2010/007434 filed on Dec. 22, 2010.

TECHNICAL FIELD

The present invention relates to a combined hot water supply and air-conditioning device that is equipped with a heat pump cycle, and capable of simultaneously providing an air conditioning load and a hot water supply load. More specifically, the present invention relates to a combined hot water supply and air-conditioning device that achieves stable supply of heat source throughout the year.

BACKGROUND ART

Conventionally, there exist combined hot water supply and air-conditioning devices capable of simultaneously providing a cooling load, a heating load, and a hot water supply load by means of a single-stage refrigeration cycle. As such a device, there has been proposed "a multifunctional heat pump system including a single compressor, and configured by a refrigerant circuit that connects the compressor, a heat source unit-side heat exchanger, a use-side heat exchanger, a cooling energy storage tank, and a hot water supply heat exchanger, in which refrigerant flows to the respective heat exchangers are switched, thereby forming a refrigeration cycle that enables an independent operation of cooling and heating/hot water supply/heat storage/cold storage and a combined operation of those operations" (see, for example, Patent Literature 1).

There also exist combined hot water supply and air-conditioning devices capable of simultaneously providing high-temperature hot water supply and an indoor air-conditioning function by means of a two-stage refrigeration cycle. As such a device, there has been proposed "a heat pump-type hot water supply device including: a refrigerant circuit on the low stage side through which a first refrigerant is made to flow and in which a first compressor, a refrigerant distributing device, a first heat exchanger, a second heat exchanger, a first expansion device, a heat source unit-side heat exchanger, a four-way valve, and the first compressor are connected in this order, and from the refrigerant distributing device, the four-way valve, a use-side heat exchanger, and a second expansion device are interposed in this order and connected between the second heat exchanger and the first expansion device; a refrigerant circuit on the high stage side through which a second refrigerant flows and in which a second compressor, a condenser, a third expansion device, the first heat exchanger, and the second compressor are connected in this order; and a hot water supply path through which water for hot water supply is made to flow and in which the second heat exchanger and the condenser are connected in this order" (see, for example, Patent Literature 2).

CITATION LIST

Patent Literature

Patent Literature 1: Japanese Unexamined Patent Application Publication No. 11-270920 (pages 3 to 4, FIG. 1)
Patent Literature 2: Japanese Unexamined Patent Application Publication No. 4-263758 (pages 2 to 3, FIG. 1)

SUMMARY OF INVENTION

Technical Problem

The multifunctional heat pump system as described in Patent Literature 1 is configured to simultaneously provide a cooling load, a heating load, and a hot water supply load by means of a single-stage refrigeration cycle, that is, a single refrigeration cycle. However, such a system has a problem in that with respect to a plurality of use demands, as many air-conditioning devices and hot water supply devices as the number of use demands are required, which increases the design load and the investment load in constructing the system.

The heat pump-type hot water supply device as described in Patent Literature 2 is configured to simultaneously provide a cooling load, a heating load, and a hot water supply load by means of a two-stage refrigeration cycle, that is, two refrigeration cycles. However, such a system has a problem in that because the refrigerant circuit that performs air-conditioning in the indoor unit, and the refrigerant circuit that performs hot water supply are handled differently, and it is not possible to simply add a hot water supply function as an alternative to the indoor unit, the system cannot be easily introduced to existing air conditioning units. Also, like the system as described in Patent Literature 1, this system has a problem in that with respect to a plurality of use demands, as many air-conditioning devices and hot water supply devices as the number of use demands are required, which increases the design load and the investment load in constructing the system.

The present invention has been made to solve the above-mentioned problems, and accordingly its object is to provide a combined hot water supply and air-conditioning device that can simultaneously process an air conditioning load and a hot water supply load, and enables stable supply of heat source even in a case where the outside air temperature is high such as in summertime.

Solution to Problem

A combined hot water supply and air-conditioning device according to the present invention includes at least one heat source unit that is equipped with an air-conditioning compressor that compresses a first refrigerant, and a heat source unit-side heat exchanger, a plurality of indoor units that are connected in parallel to the heat source unit, the indoor units being equipped with a use-side heat exchanger through which the first refrigerant flows, and at least one hot water supply unit that is connected in parallel to the heat source unit, the hot water supply unit being equipped with a refrigerant-refrigerant heat exchanger through which the first refrigerant and the second refrigerant flow, a heat medium-refrigerant heat exchanger through which a heat medium and the second refrigerant flow, and a hot water supply compressor that compresses the second refrigerant, and is characterized in that in heating operation, a capacity of the heat source unit-side heat exchanger equipped to the heat source unit is controlled to achieve a balance between a load of the heat source unit, and a total load of the indoor units and the hot water supply unit.

Advantageous Effects of Invention

In accordance with the combined hot water supply and air-conditioning device according to the present invention, the capacity of the heat source unit-side heat exchanger is controlled in heating operation to thereby achieve a balance between the load of the heat source unit and the total load of the indoor units and the hot water supply unit. Therefore, even in a case where the outside air temperature is high such as in summertime, in particular, stable hot water discharge at high temperature can be achieved.

DESCRIPTION OF EMBODIMENTS

Figure 1:
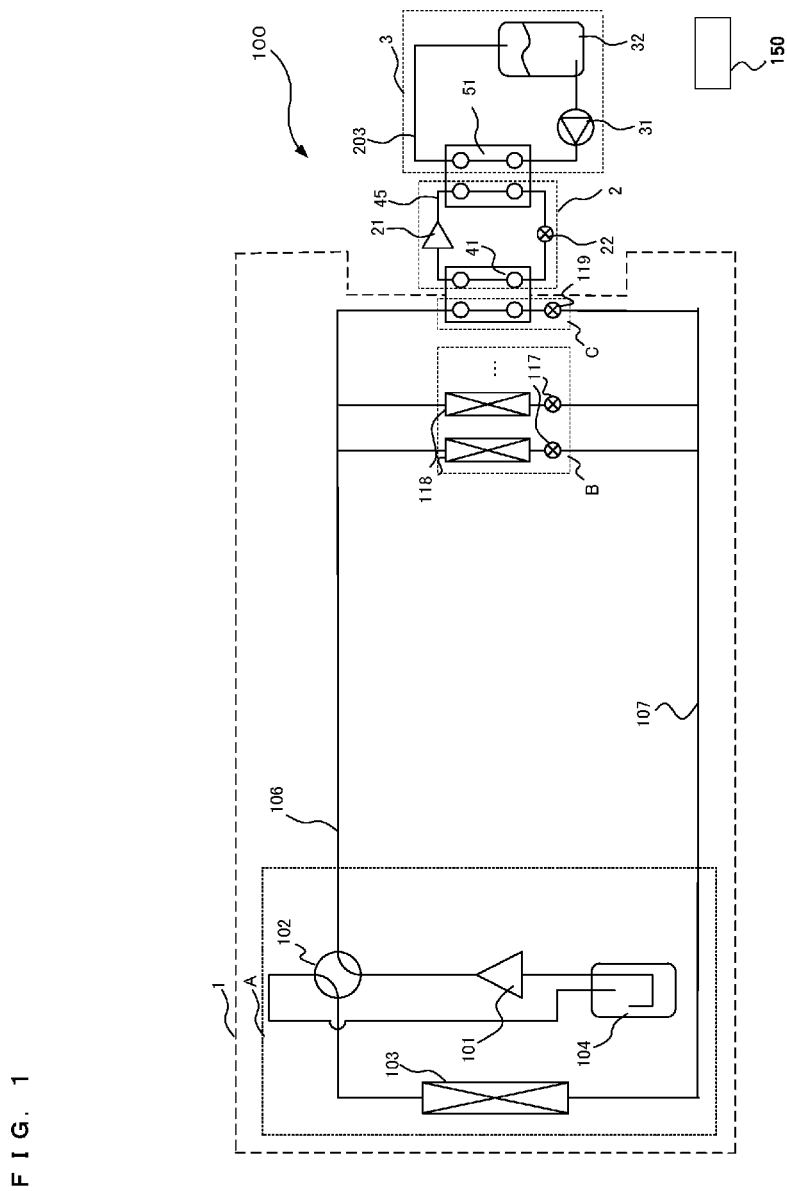
FIG. 1 is a refrigerant circuit diagram illustrating an example of the refrigerant circuit configuration of a combined hot water supply and air-conditioning device according to an embodiment of the present invention.

Hereinafter, embodiments of the present invention will be described with reference to the drawings. In the drawings, the same or equivalent portions are denoted by the same reference signs and their description is omitted or simplified as appropriate. Also, in the drawings including FIG. 1, the relative sizes of individual components may sometimes differ from the actuality.

Embodiment 1

FIG. 1 is a refrigerant circuit diagram illustrating an example of the refrigerant circuit configuration of a combined hot water supply and air-conditioning device 100 according to an embodiment of the present invention. With reference to FIG. 1, the refrigerant circuit configuration and operation of the combined hot water supply and air-conditioning device 100 will be described. The combined hot water supply and air-conditioning device 100 is installed in, for example, a sport gym, a hotel, a welfare facility, or the like, and capable of simultaneously supplying a cooling load, a heating load, and a hot water supply load by using a refrigeration cycle (heat pump cycle) that circulates refrigerant.

The combined hot water supply and air-conditioning device 100 according to Embodiment 1 has at least an air-conditioning refrigeration cycle 1, a hot water supply refrigeration cycle 2, and a hot water supply load 3. The air-conditioning refrigeration cycle 1 and the hot water supply refrigeration cycle 2, and the hot water supply refrigeration cycle 2 and the hot water supply load 3 are configured to exchange heat in a refrigerant-refrigerant heat exchanger 41 and a heat medium-refrigerant heat exchanger 51, respectively, without their refrigerants and water mixing with each other.

[Air-Conditioning Refrigeration Cycle 1]

The air-conditioning refrigeration cycle 1 is configured by a heat source unit A, a plurality of indoor units B that take charge of a cooling load or a heating load, and a hot water supply heat source circuit C that serves as a heat source for the hot water supply refrigeration cycle 2. Among these, the indoor units B and the hot water supply heat source circuit C are connected so as to be in parallel to the heat source unit A. A flow of an air-conditioning refrigerant as a first refrigerant is switched and circulated in the heat source unit A, the indoor units B, and the hot water supply heat source circuit C, thereby causing the indoor units B and the hot water supply heat source circuit C to exert their functions.

{Heat Source Unit A}

The heat source unit A has the function of supplying heating energy or cooling energy to the indoor units B and the hot water supply heat source circuit C. The heat source unit A is equipped with an air-conditioning compressor 101, a four-way valve 102 serving as flow switching means, a heat source unit-side heat exchanger 103, and an accumulator 104 that are connected in series. In the heat source unit A, an air-sending device such as a fan for supplying air to the heat source unit-side heat exchanger 103 may be provided at a position near the heat source unit-side heat exchanger 103.

The air-conditioning compressor 101 sucks an air-conditioning refrigerant, and compresses the air-conditioning refrigerant into a high-temperature/high-pressure state. The four-way valve 102 switches the flow of the air-conditioning refrigerant. The heat source unit-side heat exchanger 103 functions as an evaporator or a radiator (condenser), and exchanges heat between air supplied from an unillustrated air-sending device and the air-conditioning refrigerant to thereby cause the air-conditioning refrigerant to evaporate and gasify or condense and liquefy. The accumulator 104 is arranged on the suction side of the air-conditioning compressor 101, and stores excess air-conditioning refrigerant. The accumulator 104 may be any container capable of storing excess air-conditioning refrigerant.

{Indoor Units B}

The indoor units B have a function of receiving supply of heating energy or cooling energy from the heat source unit A, and taking charge of a heating load or a cooling load. The indoor units B are equipped with expansion means for air conditioning 117 and a use-side heat exchanger 118 that are connected in series. A case where the indoor units B are equipped with two parallel expansion means for air conditioning 117 and two parallel use-side heat exchangers 118 is illustrated by way of example. Also, in the indoor units B, an air-sending device such as a fan for supplying air to the use-side heat exchanger 118 may be provided near the use-side heat exchanger 118.

The expansion means for air conditioning 117 has a function as a pressure reducing valve or an expansion valve, and causes the air-conditioning refrigerant to expand by reducing its pressure. The expansion means for air conditioning 117 may be configured by one whose opening degree can be variably controlled, for example, precision flow control means formed by an electronic expansion valve, or inexpensive refrigerant flow regulating means such as a capillary. The use-side heat exchanger 118 functions as a radiator (condenser) or an evaporator, and exchanges heat between air supplied from an unillustrated air-sending device and the air-conditioning refrigerant, thereby causing the air-conditioning refrigerant to condense and liquefy or evaporate and gasify. The expansion means for air conditioning 117 and the use-side heat exchanger 118 are connected in series.

{Hot Water Supply Heat Source Circuit C}

The hot water supply heat source circuit C has the function of supplying the heating energy or cooling energy from the heat source unit A to the hot water supply refrigeration cycle 2 via the refrigerant-refrigerant heat exchanger 41. Expansion means for hot water supply heat source 119, and the refrigerant-refrigerant heat exchanger 41 are connected in series to the hot water supply heat source circuit C. That is, the air-conditioning refrigeration cycle 1 and the hot water supply refrigeration cycle 2 are cascade-connected by the refrigerant-refrigerant heat exchanger 41.

Like the expansion means for air conditioning 117, the expansion means for hot water supply heat source 119 has a function as a pressure reducing valve or an expansion valve, and causes the air-conditioning refrigerant to expand by reducing its pressure. The expansion means for hot water supply heat source 119 may be configured by one whose opening degree can be variably controlled, for example, precision flow control means formed by an electronic expansion valve, or inexpensive refrigerant flow regulating means such as a capillary. The refrigerant-refrigerant heat exchanger 41 functions as a radiator (condenser) or an evaporator, and exchanges heat between a hot water supply refrigerant, which is a second refrigerant circulating through the hot water supply refrigeration cycle 2, and the air-conditioning refrigerant circulating through the air-conditioning refrigeration cycle 1.

As described above, in the air-conditioning refrigeration cycle 1, the air-conditioning compressor 101, the four-way valve 102, the use-side heat exchanger 118, the expansion means for air conditioning 117, and the heat source unit-side heat exchanger 103 are connected in series, the air-conditioning compressor 101, the four-way valve 102, the refrigerant-refrigerant heat exchanger 41, the expansion means for hot water supply heat source 119, and the heat source unit-side heat exchanger 103 are connected in series, and the use-side heat exchanger 118 and the refrigerant-refrigerant heat exchanger 41 are connected in parallel to thereby form a first refrigerant circuit. The air-conditioning refrigeration cycle 1 is established by circulating the air-conditioning refrigerant through this first refrigerant circuit. The four-way valve 102, and the use-side heat exchanger 118 and the refrigerant-refrigerant heat exchanger 41 are connected by a gas-side connecting pipe 106. Also, the heat source unit-side heat exchanger 103, and the expansion means for air conditioning 117 and the expansion means for hot water supply heat source 119 are connected by a liquid-side connecting pipe 107.

The air-conditioning compressor 101 may be any compressor capable of compressing a sucked refrigerant into a high-pressure state, and is not limited to a particular type. For example, the air-conditioning compressor 101 can be configured by using various types of compressors such as a reciprocating, rotary, scroll, or screw type. The air-conditioning compressor 101 may be configured as a compressor of a type whose rotation speed can be variably controlled by an inverter, or may be configured as a compressor of a type whose rotation speed is fixed.

The kind of refrigerant that circulates through the air-conditioning refrigeration cycle 1 is not particularly limited. For example, any one of a natural refrigerant such as carbon dioxide ($CO_2$), hydrocarbon, or helium, an alternative refrigerant not containing chlorine such as HFC410A, HFC407C, or HFC404A, and a fluorocarbon refrigerant such as R22 or R134a used in existing products may be used.

Now, operation of the air-conditioning refrigeration cycle 1 will be described.

Here, an operation in a case where the indoor units B take charge of a heating load, and the hot water supply heat source circuit C takes charge of a hot water supply load will be described.

First, an air-conditioning refrigerant that has been turned into high temperature/high pressure in the air-conditioning compressor 101 is discharged from the air-conditioning compressor 101, is introduced to the gas-side connecting pipe 106 via the four-way valve 102, and enters each of the indoor units B and the hot water supply heat source circuit C as an air-conditioning refrigerant in a superheated gas state.

The air-conditioning refrigerants that have entered the respective indoor units B reject heat (i.e. heat the indoor air) in the use-side heat exchanger 118, are reduced in pressure in the expansion means for air conditioning 117, and exit the indoor units B and merge. Also, the air-conditioning refrigerant that has entered the hot water supply heat source circuit C rejects heat (i.e. gives heat to the hot water supply refrigeration cycle 2) in the refrigerant-refrigerant heat exchanger 41, is reduced in pressure by the expansion means for hot water supply heat source 119, exits the hot water supply heat source circuit C, and merges with the air-conditioning refrigerant that has exited the indoor units B. The merged air-conditioning refrigerant is introduced to the heat source unit-side heat exchanger 103 and, depending on the operating condition, causes the remaining liquid refrigerant to evaporate, and returns to the air-conditioning compressor 101 via the four-way valve 102 and the accumulator 104.

[Hot Water Supply Refrigeration Cycle 2]

The hot water supply refrigeration cycle 2 is configured by a hot water supply compressor 21, the heat medium-refrigerant heat exchanger 51, expansion means for hot water supply 22, and the refrigerant-refrigerant heat exchanger 41. That is, the hot water supply refrigeration cycle 2 is established by connecting the hot water supply compressor 21, the heat medium-refrigerant heat exchanger 51, the expansion means for hot water supply 22, and the refrigerant-refrigerant heat exchanger 41 in series by a refrigerant pipe 45 to form a second refrigerant circuit, and circulating the hot water supply refrigerant through this second refrigerant circuit.

The hot water supply compressor 21 sucks a hot water supply refrigerant, and compresses the hot water supply refrigerant into a high-temperature/high-pressure state. The hot water supply compressor 21 may be configured as a compressor of a type whose rotation speed can be variably controlled by an inverter, or may be configured as a compressor of a type whose rotation speed is fixed. Also, the hot water supply compressor 21 may be any compressor capable of compressing a sucked refrigerant into a high-pressure state, and is not limited to a particular type. For example, the hot water supply compressor 21 can be configured by using various types of compressors such as a reciprocating, rotary, scroll, or screw type.

The heat medium-refrigerant heat exchanger 51 exchanges heat between a heat medium (fluid such as water or antifreeze) that circulates through the hot water supply load 3, and the hot water supply refrigerant that circulates through the hot water supply refrigeration cycle 2. That is, the hot water supply refrigeration cycle 2 and the hot water supply load 3 are cascade-connected via the heat medium-refrigerant heat exchanger 51. The expansion means for hot water supply 22 has a function as a pressure reducing valve or an expansion valve, and causes the hot water supply refrigerant to expand by reducing its pressure. The expansion means for hot water supply 22 may be configured by one whose opening degree can be variably controlled, for example, precision flow control means formed by an electronic expansion valve, or inexpensive refrigerant flow regulating means such as a capillary. The refrigerant-refrigerant heat exchanger 41 exchanges heat between the hot water supply refrigerant that circulates through the hot water supply refrigeration cycle 2, and the air-conditioning refrigerant that circulates through the air-conditioning refrigeration cycle 1.

The kind of the hot water supply refrigerant that circulates through the hot water supply refrigeration cycle 2 is not particularly limited. For example, any one of a natural refrigerant such as carbon dioxide, hydrocarbon, or helium, an alternative refrigerant not containing chlorine such as HFC410A, HFC407C, or HFC404A, and a fluorocarbon refrigerant such as R22 or R134a used in existing products may be used.

Now, operation of the hot water supply refrigeration cycle 2 will be described.

First, a hot water supply refrigerant that has been turned into high temperature/high pressure in the hot water supply compressor 21 is discharged from the hot water supply compressor 21, and enters the heat medium-refrigerant heat exchanger 51. In the heat medium-refrigerant heat exchanger 51, the hot water supply refrigerant that has entered the heat medium-refrigerant heat exchanger 51 rejects heat to thereby heat the water circulating through the hot water supply load 3. This hot water supply refrigerant is expanded in the expansion means for hot water supply 22 to a temperature not higher than the outlet temperature of the refrigerant-refrigerant heat exchanger 41 in the hot water supply heat source circuit C of the air-conditioning refrigeration cycle 1. In the refrigerant-refrigerant heat exchanger 41, the expanded hot water supply refrigerant evaporates by receiving heat from the air-conditioning refrigerant flowing through the hot water supply heat source circuit C constituting the air-conditioning refrigeration cycle 1, and returns to the hot water supply compressor 21.

[Hot Water Supply Load 3]

The hot water supply load 3 is configured by a water circulation pump 31, the heat medium-refrigerant heat exchanger 51, and a hot water storage tank 32. That is, the hot water supply load 3 is established by connecting the water circulation pump 31, the heat medium-refrigerant heat exchanger 51, and the hot water storage tank 32 in series by a stored hot water circulation pipe 203 to form a water circuit (heat medium circuit), and circulating water used for hot water supply through this water circuit. The stored hot water circulation pipe 203 constituting the water circuit is formed by a copper pipe, a stainless pipe, a steel pipe, a vinyl chloride pipe, or the like.

The water circulation pump 31 sucks water stored in the hot water storage tank 32, pressurizes the water, and circulates the water within the hot water supply load 3. For example, the water circulation pump 31 may be configured by a pump of a type whose rotation speed is controlled by an inverter. As described above, the heat medium-refrigerant heat exchanger 51 exchanges heat between the heat medium (fluid such as water or antifreeze) that circulates through the hot water supply load 3, and the hot water supply refrigerant that circulates through the hot water supply refrigeration cycle 2. The hot water storage tank 32 stores water heated in the heat medium-refrigerant heat exchanger 51.

Now, operation of the hot water supply load 3 will be described.

First, water at a relatively low temperature stored in the hot water storage tank 32 is drawn from the bottom of the hot water storage tank 32 and pressurized by the water circulation pump 31. The water pressurized by the water circulation pump 31 enters the heat medium-refrigerant heat exchanger 51, and in the heat medium-refrigerant heat exchanger 51, the water receives heat from the hot water supply refrigerant circulating through the hot water supply refrigeration cycle 2. That is, the water that has entered the heat medium-refrigerant heat exchanger 51 is boiled by the hot water supply refrigerant circulating through the hot water supply refrigeration cycle 2, and rises in temperature. Then, the boiled water returns to the upper portion of the hot water storage tank 32 where the temperature is relatively high, and is stored in the hot water storage tank 32.

For the convenience of explanation, the refrigerant-refrigerant heat exchanger 41, the expansion means for hot water supply heat source 119, the heat medium-refrigerant heat exchanger 51, the hot water supply compressor 21, and the expansion means for hot water supply 22 will be referred to as hot water supply unit. Although not illustrated, the combined hot water supply and air-conditioning device 100 is provided with a sensor that detects the discharge pressure of the air-conditioning refrigerant, a sensor that detects the suction pressure of the air-conditioning refrigerant, a sensor that detects the discharge temperature of the air-conditioning refrigerant, a sensor that detects the suction temperature of the air-conditioning refrigerant, a sensor that detects the temperature of the air-conditioning refrigerant existing and entering the heat source unit-side heat exchanger 103, a sensor that detects the temperature of the outside air taken into the heat source unit A, a sensor that detects the temperature of the air-conditioning refrigerant existing and entering the use-side heat exchanger 118, a sensor that detects the temperature of water stored in the hot water storage tank 32, and the like.

Pieces of information (such as temperature information and pressure information) detected by these various sensors are sent to a controller 150 that controls the operation of the combined hot water supply and air-conditioning device 100, and used to control the driving frequency of the air-conditioning compressor 101, switching of the four-way valve 102, the driving frequency of the hot water supply compressor 21, driving of the water circulation pump 31, the opening degree of each expansion means, and the like.

As described above, the air-conditioning refrigeration cycle 1 and the hot water supply refrigeration cycle 2 have mutually independent refrigerant circuit configurations (the first refrigerant circuit constituting the air-conditioning refrigeration cycle 1 and the second refrigerant circuit constituting the hot water supply refrigeration cycle 2). Accordingly, the kinds of refrigerants to be circulated through the respective refrigerant circuits may be the same or may be different. That is, the refrigerants in the respective refrigerant circuits flow in such a way as to exchange heat with one another in the refrigerant-refrigerant heat exchanger 41 and the heat medium-refrigerant heat exchanger 51 without mixing with one another.

In a case where a refrigerant with a low critical temperature is used as the hot water supply refrigerant, it is expected that the hot water supply refrigerant becomes a supercritical state in the heat rejection process in the heat medium-refrigerant heat exchanger 51 when supplying hot water at high temperature. However, generally, in a case where a refrigerant in the heat rejection process is in the supercritical state, the COP fluctuates greatly with changes in radiator pressure or radiator outlet temperature. Therefore, more sophisticated control is required to perform an operation that provides high COP. Also, a refrigerant with a low critical temperature generally exhibits high saturation pressure at the same temperature and, accordingly, the pipe and the compressor need to be increased in wall thickness, which also causes an increase in cost.

Further, considering the fact that the recommended temperature of water stored in the hot water storage tank 32 for suppressing propagation of legionella bacteria or the like is 62° C. or more, it is expected that the target temperature of hot water supply is set to at least 62° C. or more in many cases. With the above points in mind, a refrigerant with a critical temperature of at least 62° C. or more is used as the hot water supply refrigerant. This is because adopting such a refrigerant as the hot water supply refrigerant for the hot water supply refrigeration cycle 2 makes it possible to attain high COP at lower cost and in a more stable manner.

While the above description is directed to a case where excess refrigerant is stored in a liquid receiver (accumulator 104) in the air-conditioning refrigeration cycle 1, this is not intended to be limitative. The accumulator 104 may be removed if the excess refrigerant is stored in a heat exchanger that acts as a radiator in the refrigeration cycle. Further, while FIG. 1 illustrates a case where two or more indoor units B are connected, the number of indoor units B to be connected is not particularly limited. For example, it suffices that one or more indoor units B be connected. The capacities of the indoor units constituting the air-conditioning refrigeration cycle 1 may all be the same or may vary from large to small.

As described above, in the combined hot water supply and air-conditioning device 100 according to this embodiment, the hot water supply load system is configured by a dual cycle. Accordingly, to meet a high-temperature hot water supply demand (e.g. 80° C.), it only needs to set the temperature of the radiator in the hot water supply refrigeration cycle 2 to a high temperature (e.g. a condensing temperature of 85° C.), and in a case where there is also a heating load, it is unnecessary to increase even the condensing temperature (e.g. 50° C.) of the indoor units B, resulting in energy saving. In a case where there is a demand for high-temperature hot water supply during air-conditioning cooling operation in summertime, conventionally, the demand needs to be met by means of a boiler or the like. However, in the combined hot water supply and air-conditioning device 100, the heating energy conventionally emitted into the atmosphere is recovered and reused to supply hot water. Therefore, the system COP significantly improves, resulting in energy saving.

Also, in the combined hot water supply and air-conditioning device 100, the load of the indoor units B and the load of the hot water supply unit can be switched by a flow switching device such as a flow switching valve, for example. In this way, switching of the daytime air conditioning load in the indoor units B and the nighttime cooling load in the hot water supply unit, or switching of the daytime air conditioning load in the indoor units B and the heating load in the hot water supply unit can be executed as appropriate. Therefore, electric power leveling can be achieved, redundant facility cost can be eliminated, and also the running cost becomes low. That is, by enabling switching between the air conditioning load and the hot water supply load, nighttime electric power can be effectively utilized.

Figure 2:
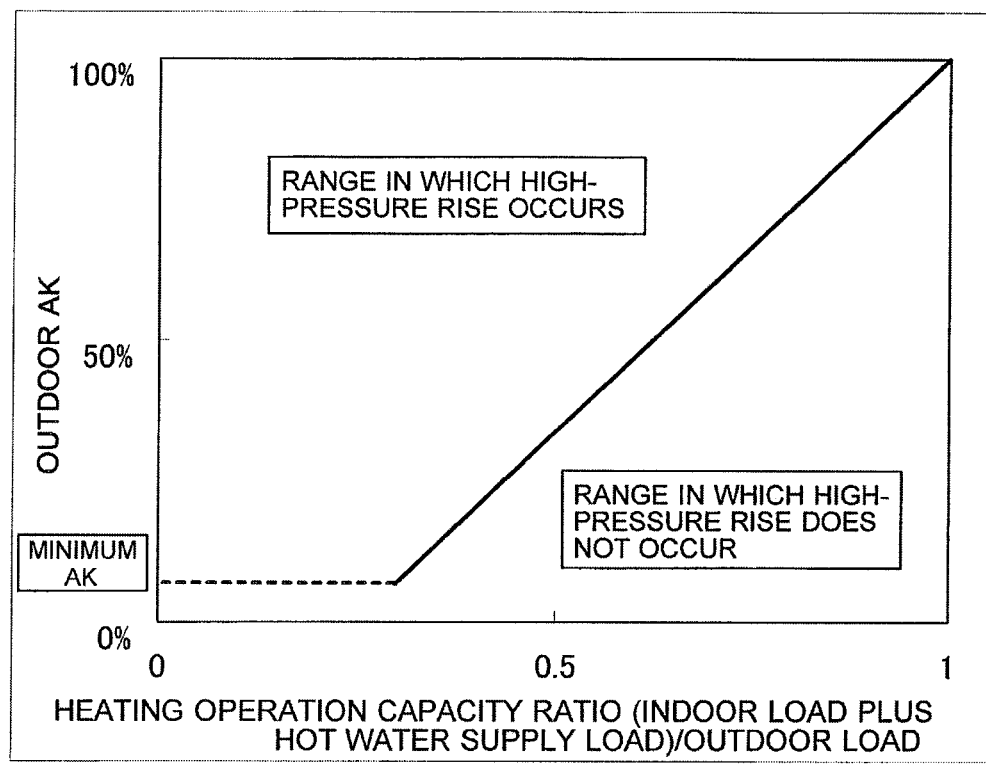
FIG. 2 is a graph illustrating the relationship between the heat exchanger capability of a heat source unit-side heat exchanger, and heating operation capacity ratio/outdoor load.

FIG. 2 is a graph illustrating the relationship between the heat exchanger capability of the heat source unit-side heat exchanger 103, and heating operation capacity ratio/outdoor load. With reference to FIG. 2, the heat source unit-side heat exchanger 103 configured to be capable of heating operation throughout the year will be described. In FIG. 2, the vertical axis represents the heat exchanger capability (outdoor AK) of the heat source unit-side heat exchanger 103, and the horizontal axis represents the heating operation capacity ratio (indoor load+hot water supply load)/outdoor load.

In a case where the combined hot water supply and air-conditioning device 100 is used for the normal air-conditioning purpose only, it is common to perform a heating operation at an outside air wet-bulb temperature of 15° C. or less. In a case where the combined hot water supply and air-conditioning device 100 is used to perform a hot water supply operation under a condition where the outside air wet-bulb temperature exceeds 15° C. such as in summertime, the hot water supply operation needs to be performed irrespective of the outside air temperature. Also, in a case where a combined hot water supply and air-conditioning device capable of switching between a cooling operation and a heating operation is used under a condition where the outside air wet-bulb temperature exceeds 15° C. such as in summertime, the evaporation capability becomes excessive relative to the condensation capability. Therefore, a high-pressure rise tends to occur, which makes high-temperature hot water discharge impossible.

Accordingly, in the combined hot water supply and air-conditioning device 100, when the outside air wet-bulb temperature has risen to 32° C., the heat exchanger capability (outdoor AK) of the heat source unit-side heat exchanger 103 is lowered to thereby prevent deviation from the operating range of the air-conditioning compressor 101 and suppress high-pressure rise. Specifically, as illustrated in FIG. 2, in the combined hot water supply and air-conditioning device 100, the capacity of the heat source unit-side heat exchanger 103 is controlled in heating operation to achieve a balance between the load of the heat source unit A and the total load of the plurality of indoor units B and the hot water supply unit, thereby enabling stable supply of heat source even in a case where the outside air temperature is high such as in summertime. For example, the controller 150 for driving the air-conditioning compressor 101 in the heat source unit A is required to make the airflow equal to or more than a predetermined airflow so that the input to the air-conditioning compressor 101 is subjected to a predetermined amount of heat rejection. Therefore, there is a lower limit (minimum AK) for the heat exchanger capability (outdoor AK) of the heat source unit A, and the heat exchanger capability (outdoor AK) cannot be lowered below this lower limit. From this minimum AK, operation can be continued within a range in which the heat exchanger capability (outdoor AK) of the heat source unit-side heat exchanger 103 and the heating operation capacity ratio ((indoor load plus hot water supply load)/outdoor load) are in a balanced state (solid line). With this solid line as a boundary, the upper left range is the range in which high-pressure rise occurs, and the lower right range is the range in which high-pressure rise does not occur. In particular, in a case where the outside air temperature is high such as when the outside air wet-bulb temperature is 32° C., the minimum AK is approached.

Control of the capacity of the heat source unit-side heat exchanger 103 may be executed by, for example, regulating the amount of refrigerant passed to a heat transfer tube constituting the heat exchanger, or by regulating the airflow supplied to the heat exchanger. When only the hot water supply unit is operating, the capacity of the heat source unit-side heat exchanger 103 may be controlled so that the high-pressure side pressure of the discharge refrigerant from the air-conditioning compressor 101 is within a predetermined range.

According to the combined hot water supply and air-conditioning device 100 configured as described above, by controlling the capacity of the heat source unit-side heat exchanger 103, the air conditioning load and the hot water supply load are balanced, thereby achieving stable heating operation even in a case where the outside air temperature is high such as in summertime. Also, by enabling switching between the air conditioning load and the hot water supply load, during the day, air-conditioning of a studio, a general office room, or the like is performed, while during the night, the water in a pool is cooled in summertime and heated in wintertime. Thus, the air-conditioning equipment and the hot water supply equipment are used in a common manner. As a result, not only the initial cost decreases but also electric power leveling is performed through effective utilization of nighttime electric power, resulting in energy saving. In addition, according to the combined hot water supply and air-conditioning device 100, not only stable hot water discharge at high temperature becomes possible even in a case where the outside air temperature is high, but also no special configuration is required to achieve that end, thereby also enabling a corresponding reduction in cost.

Figure 3:
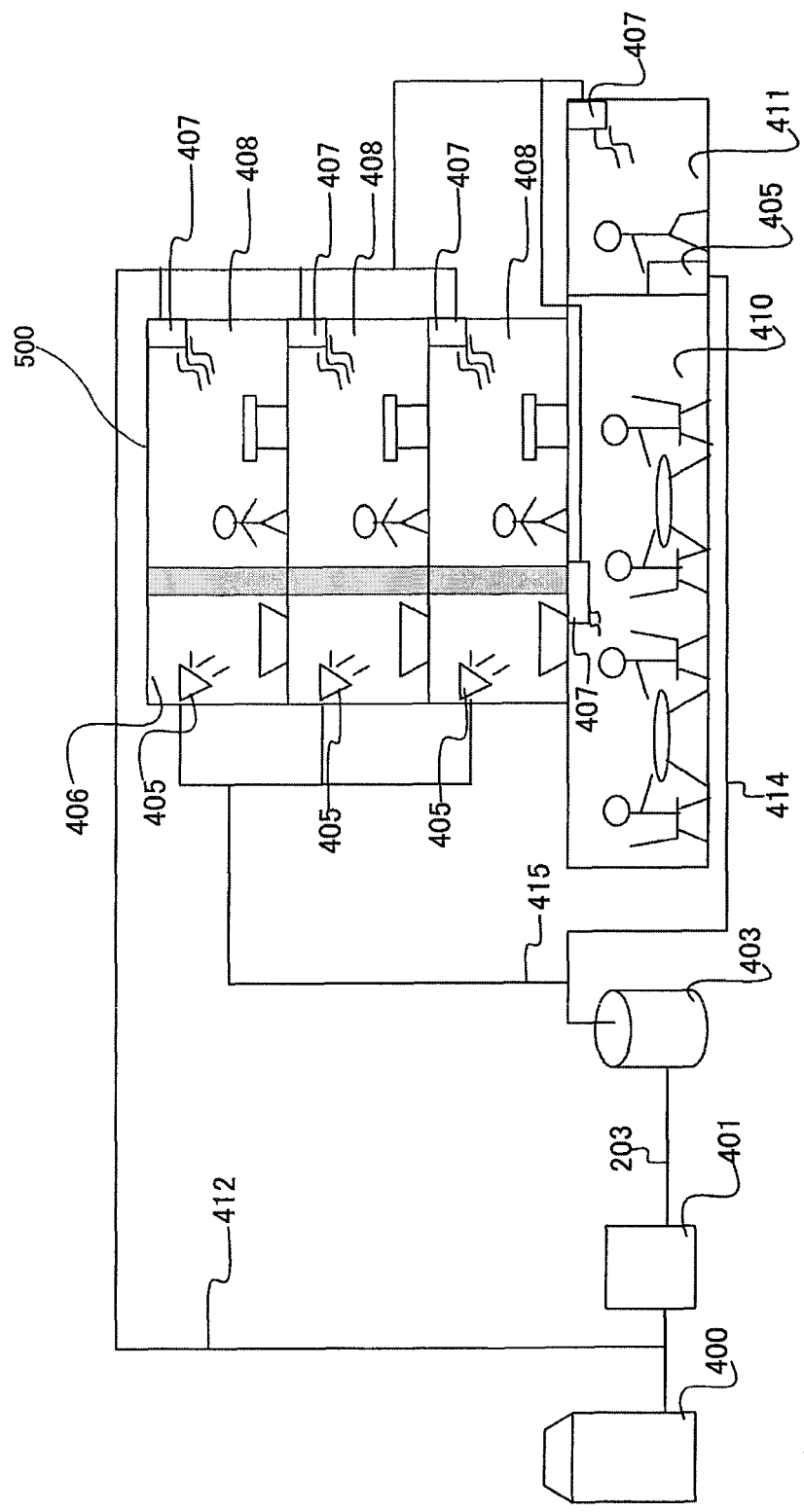
FIG. 3 is a schematic diagram illustrating an installation example of a combined hot water supply and air-conditioning device according to Embodiment 1 of the present invention.

FIG. 3 is a schematic diagram illustrating an installation example of the combined hot water supply and air-conditioning device 100. With reference to FIG. 3, an operation method based on an installation of the combined hot water supply and air-conditioning device 100 will be described in detail. FIG. 3 conceptually illustrates a state in which the combined hot water supply and air-conditioning device 100 is installed in a building 500 such as a sport gym, a hotel, or a welfare facility. The building 500 has a commercial facility 410 including a living space 408 with a hot water supply use room 406, and a kitchen 411.

The combined hot water supply and air-conditioning device 100 is configured by connecting an outdoor unit 400, a hot water supply device 401, and five indoor air-conditioning units 407 by a refrigerant pipe 412 (corresponding to the gas-side connecting pipe 106 and the liquid-side connecting pipe 107). The outdoor unit 400 corresponds to the heat source unit A illustrated in FIG. 1. The hot water supply device 401 corresponds to the hot water supply unit illustrated in FIG. 1. The indoor air-conditioning units 407 correspond to the indoor units B illustrated in FIG. 1.

A hot water storage tank 403 corresponding to the hot water storage tank 32 is connected to the hot water supply device 401 via the stored hot water circulation pipe 203. The hot water storage tank 403 is connected to a hot water discharging device for hot water supply 405 of the hot water supply use room 406 via a supply main pipe 415, and to the hot water discharging device for hot water supply 405 in the kitchen 411 via a supply pipe 414.

An operation method of the combined hot water supply and air-conditioning device 100 throughout the year will be described.

<Operation Method of Combined Hot Water Supply and Air-Conditioning Device 100 in Summertime>

In this case, it is frequently the case that the outdoor unit 400 performs a heating operation, and the indoor air-conditioning units 407 perform a cooling operation. Also, in the hot water supply use room 406 installed in the living space 408, hot water is frequently used at all hours. That is, in the hot water supply use room 406, hot water is frequently used by people for purposes such as taking a shower or a bath. Further, in the kitchen 411, there are frequent uses for hot water supply purpose and cooling purpose throughout the year.

However, in summertime, the outside air temperature is usually high. Accordingly, in the combined hot water supply and air-conditioning device 100, the setting temperature is set low, and the amount of hot water to be stored in the hot water supply tank 403 is increased. Also, in the combined hot water supply and air-conditioning device 100, the heat conventionally discarded as exhaust heat in the outdoor unit 400 is used for the boiling operation of hot water in the hot water supply device 401, thereby enabling energy saving operation.

Also, in summertime, low temperatures are sufficient as the temperature zone used for hot water supply purpose, and the setting temperature can be lowered. Thus, the hot water supply device 401 only needs to be operated for a short time, and the operating time can be reduced for the system as well, thereby enabling energy saving operation. Further, in a case where no air conditioning load is used in the living space 408 in summertime, a heating operation is executed in the hot water supply device 401, and heat is exhausted to the living space 408, thereby enabling energy saving operation for the system. While the above description is directed to air-conditioning use through the medium of a refrigerant, cold water produced in the hot water supply device 401 may be used for cooling by using a fan coil unit or the like.

<Use Condition of Combined Hot Water Supply and Air-Conditioning Device 100 in Wintertime>

In this case, it is frequently the case that the outdoor unit 400 performs a cooling operation, and the indoor air-conditioning units 407 perform a heating operation. Also, in the hot water supply use room 406 installed in the living space 408, hot water is frequently used at all hours. Further, during the night or in the early morning, an operation for protecting against pipe freezing due to a drop in outside air temperature is required for the supply pipe 414 and the supply main pipe 415. Also, throughout the year, uses for hot water supply purpose and cooling purpose are required in the kitchen 411.

In wintertime, it is conceivable that the water pipe that conducts water may freeze. Accordingly, an anti-freezing protection operation is conventionally performed by winding an electric heater or the like onto the water pipe. In contrast, in the combined hot water supply and air-conditioning device 100, medium-temperature water stored in the hot water storage tank 403 may be supplied during the night or when the outside air temperature drops, thereby preventing pipe freezing.

According to the combined hot water supply and air-conditioning device 100 configured as described above, the capacity of the heat source unit-side heat exchanger 103 is controlled in heating operation to achieve a balance between the load of the heat source unit A and the total load of the indoor units B and the hot water supply unit, thereby enabling stable hot water discharge at high temperature, particularly even in a case where the outside air temperature is high such as in summertime. Therefore, it is possible to achieve an operation that provides optimum energy efficiency throughout the year.

Embodiment 2

Figure 4:
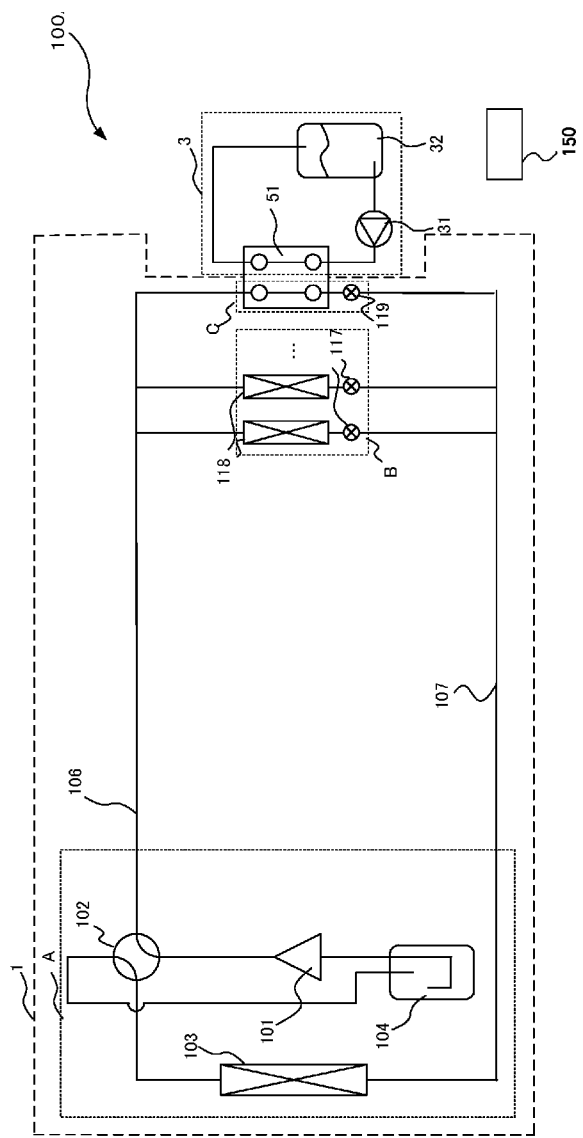
FIG. 4 is a refrigerant circuit diagram illustrating an example of the refrigerant circuit configuration of a combined hot water supply and air-conditioning device according to Embodiment 2 of the present invention.

FIG. 4 is a refrigerant circuit diagram illustrating an example of the refrigerant circuit configuration of a combined hot water supply and air-conditioning device 100A according to Embodiment 2 of the present invention. The combined hot water supply and air-conditioning device 100A will be described with reference to FIG. 4. In a case where medium-temperature hot water supply demand (e.g. 45° C.) is to be met, like the combined hot water supply and air-conditioning device 100 according to Embodiment 1, the combined hot water supply and air-conditioning device 100A is installed in, for example, a sport gym, a hotel, or a welfare facility, and is capable of simultaneously supplying a cooling load, a heating load, and a hot water supply load by using a refrigeration cycle (heat pump cycle) that circulates refrigerant.

As illustrated in FIG. 4, the combined hot water supply and air-conditioning device 100A is not provided with the hot water supply refrigeration cycle 2. That is, the combined hot water supply and air-conditioning device 100A is configured to connect the air-conditioning refrigeration cycle and the hot water supply load 3 via the heat medium-refrigerant heat exchanger 51. It is needless to mention that the combined hot water supply and air-conditioning device 100A may be installed in the manner as illustrated in FIG. 3. Also, the hot water supply unit is equipped with at least a part of the heat medium-refrigerant heat exchanger 51.

According to the combined hot water supply and air-conditioning device 100A configured as described above, like the combined hot water supply and air-conditioning device 100 according to Embodiment 1, by controlling the capacity of the heat source unit-side heat exchanger 103, the air conditioning load and the hot water supply load are balanced, thereby achieving stable heating operation even in a case where the outside air temperature is high such as in summertime. Also, by enabling switching between the air conditioning load and the hot water supply load, during the day, air-conditioning of a studio, a general office room, or the like is performed, and during the night, the water in a pool is cooled in summertime and heated in wintertime. Thus, the air-conditioning equipment and the hot water supply equipment are used in a common manner. As a result, not only the initial cost decreases but also electric power leveling is performed through effective utilization of nighttime electric power, resulting in energy saving. In addition, according to the combined hot water supply and air-conditioning device 100A, not only stable hot water discharge at high temperature becomes possible even in a case where the outside air temperature is high, but also no special configuration is required to achieve that end, thereby also enabling a corresponding reduction in cost.

Also, in the combined hot water supply and air-conditioning device 100A, the load of the indoor units B and the load of the hot water supply unit can be switched. In this way, switching of the daytime air conditioning load in the indoor units B and the nighttime cooling load in the hot water supply unit, or switching of the daytime air conditioning load in the indoor units B and the heating load in the hot water supply unit can be executed as appropriate. Therefore, electric power leveling can be achieved, redundant facility cost can be eliminated, and also the running cost becomes low. That is, by enabling switching between the air conditioning load and the hot water supply load, nighttime electric power can be effectively utilized.

Embodiment 3

Figure 5:
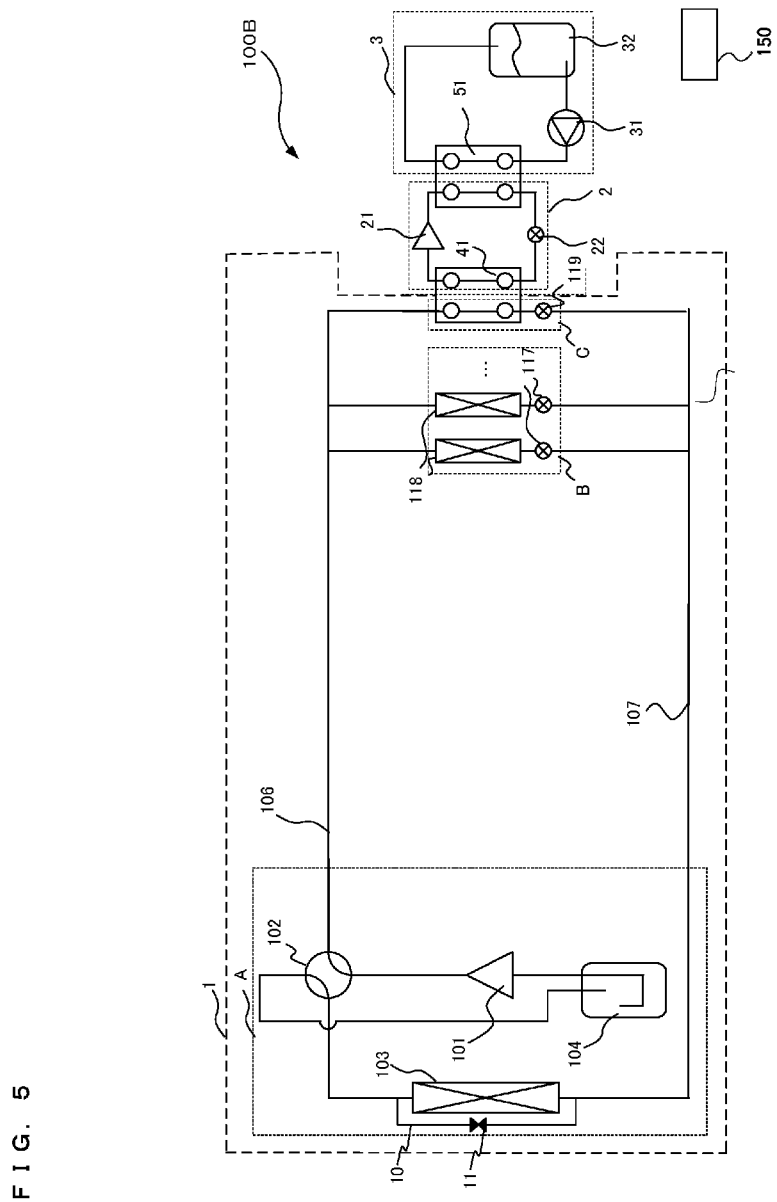
FIG. 5 is a refrigerant circuit diagram illustrating an example of the refrigerant circuit configuration of a combined hot water supply and air-conditioning device according to Embodiment 3 of the present invention.

FIG. 5 is a refrigerant circuit diagram illustrating an example of the refrigerant circuit configuration of a combined hot water supply and air-conditioning device 100B according to Embodiment 3 of the present invention. The combined hot water supply and air-conditioning device 100B will be described with reference to FIG. 5. Like the combined hot water supply and air-conditioning device 100 according to Embodiment 1, the combined hot water supply and air-conditioning device 100B is installed in, for example, a sport gym, a hotel, or a welfare facility, and is capable of simultaneously supplying a cooling load, a heating load, and a hot water supply load by using a refrigeration cycle (heat pump cycle) that circulates refrigerant.

The combined hot water supply and air-conditioning device 100B differs from the combined hot water supply and air-conditioning device according to Embodiment 1 or Embodiment 2 in that there is provided a bypass pipe 10 that bypasses the heat source unit-side heat exchanger 103 as illustrated in FIG. 5. The bypass pipe 10 is provided so as to connect the outlet and inlet sides of the heat source unit-side heat exchanger 103. Also, a bypass valve 11 that opens and closes the bypass pipe 10 is installed in the bypass pipe 10. That is, by controlling opening and closing of the bypass valve 11, a part of refrigerant entering the heat source unit-side heat exchanger 103 is made to enter the bypass pipe 10, thereby controlling the capacity of the heat source unit-side heat exchanger 103. It is needless to mention that the combined hot water supply and air-conditioning device 100B may be installed in the manner as illustrated in FIG. 3.

According to the combined hot water supply and air-conditioning device 100B configured as described above, like the combined hot water supply and air-conditioning device 100 according to Embodiment 1, by controlling the capacity of the heat source unit-side heat exchanger 103, the air conditioning load and the hot water supply load are balanced, thereby achieving stable heating operation even in a case where the outside air temperature is high such as in summertime. Also, by enabling switching between the air conditioning load and the hot water supply load, during the day, air-conditioning of a studio, a general office room, or the like is performed, while during the night, the water in a pool is cooled in summertime and heated in wintertime. Thus, the air-conditioning equipment and the hot water supply equipment are used in a common manner. As a result, not only the initial cost decreases but also electric power leveling is performed through effective utilization of nighttime electric power, resulting in energy saving. In addition, according to the combined hot water supply and air-conditioning device 100B, not only stable hot water discharge at high temperature becomes possible even in a case where the outside air temperature is high, but also no special configuration is required to achieve that end, thereby also enabling a corresponding reduction in cost.

Also, in the combined hot water supply and air-conditioning device 100B, the load of the indoor units B and the load of the hot water supply unit can be switched by a flow switching device such as a flow switching valve. In this way, switching of the daytime air conditioning load in the indoor units B and the nighttime cooling load in the hot water supply unit, or switching of the daytime air conditioning load in the indoor units B and the heating load in the hot water supply unit can be executed as appropriate. Therefore, electric power leveling can be achieved, redundant facility cost can be eliminated, and also the running cost becomes low. That is, by enabling switching between the air conditioning load and the hot water supply load, nighttime electric power can be effectively utilized.

REFERENCE SIGNS LIST

1: air-conditioning refrigeration cycle, 2: hot water supply refrigeration cycle, 3: hot water supply load, 10: bypass pipe, 11: bypass valve, 21: hot water supply compressor, 22: expansion means for hot water supply, 31: water circulation pump, 32: hot water storage tank, 41: refrigerant heat exchanger, 45: refrigerant pipe, 51: refrigerant heat exchanger, 100: combined hot water supply and air-conditioning device, 100A: combined hot water supply and air-conditioning device, 100B: combined hot water supply and air-conditioning device, 101: air-conditioning compressor, 102: four-way valve, 103: heat source unit-side heat exchanger, 104: accumulator, 106: gas-side connecting pipe, 107: liquid-side connecting pipe, 117: expansion means for air conditioning, 118: use-side heat exchanger, 119: expansion means for hot water supply heat source, 150: controller, 203: stored hot water circulation pipe, 400: outdoor unit, 401: hot water supply device, 403: hot water storage tank, 405: hot water discharging device for hot water supply, 406: hot water supply use room, 407: indoor air-conditioning unit, 408: living space, 410: commercial facility, 411: kitchen, 412: refrigerant pipe, 414: supply pipe, 415: supply main pipe, 500: building, A: heat source unit, B: indoor unit, C: hot water supply heat source circuit.

The invention claimed is:

1. A combined hot water supply and air-conditioning device comprising:
   at least one heat source unit that is equipped with an air-conditioning compressor that compresses a first refrigerant, and a heat source unit-side heat exchanger;
   a plurality of indoor units that are connected in parallel to the heat source unit, the indoor units being equipped with a use-side heat exchanger through which the first refrigerant flows;
   at least one hot water supply unit that is connected in parallel to the heat source unit, the hot water supply unit being equipped with a refrigerant-refrigerant heat exchanger through which the first refrigerant and a second refrigerant flow, a heat medium-refrigerant heat exchanger through which a heat medium and the second refrigerant flow, and a hot water supply compressor that compresses the second refrigerant; and
   a controller configured to control a capacity of the heat source unit-side heat exchanger equipped to the heat source unit;
   wherein in heating operation, the controller is configured to
   set a lower limit for a capacity of the heat source unit-side heat exchanger, and
   control the capacity of the heat source unit-side heat exchanger to adjust the capacity of the heat source unit-side heat exchanger relative to a heating operation capacity ratio to prevent deviation from a predetermined operating range of the air-conditioning compressor and to suppress an increase in pressure, the heating operation capacity ratio is a value obtained by dividing a total load of the indoor units and the hot water supply unit by a load of the heat source unit.

2. A combined hot water supply and air-conditioning device comprising:
   at least one heat source unit that is equipped with an air-conditioning compressor that compresses a first refrigerant, and a heat source unit-side heat exchanger;
   a plurality of indoor units that are connected in parallel to the heat source unit, the indoor units being equipped with a use-side heat exchanger through which the first refrigerant flows;
   at least one hot water supply unit that is connected in parallel to the heat source unit, the hot water supply unit being equipped with at least a heat medium-refrigerant heat exchanger through which a heat medium and the first refrigerant flow; and
   a controller configured to control a capacity of the heat source unit-side heat exchanger equipped to the heat source unit;
   wherein in heating operation, the controller is configured to
   set a lower limit for a capacity of the heat source unit-side heat exchanger, and
   control the capacity of the heat source unit-side heat exchanger to adjust the capacity of the heat source unit-side heat exchanger relative to heating operation capacity ratio to prevent deviation from a predetermined operating range of the air-conditioning compressor and to suppress an increase in pressure, the heating operation capacity ratio is a value obtained by dividing a total load of the indoor units and the hot water supply unit by a load of the heat source unit.

3. The combined hot water supply and air-conditioning device of claim 1, wherein:
   the combined hot water supply and air-conditioning device is provided with
   a bypass pipe that bypasses the heat source unit-side heat exchanger, and
   a bypass valve that is installed in the bypass pipe; and
   the controller is configured to control the capacity of the heat source unit-side heat exchanger equipped to the heat source unit by regulating a flow rate of the first refrigerant entering the bypass pipe by controlling the bypass valve.

4. The combined hot water supply and air-conditioning device of claim 1, wherein the controller is configured to switch a load of the indoor units and a load of the hot water supply unit.

5. The combined hot water supply and air-conditioning device of claim 1, wherein in a state in which the indoor units are stopped and the hot water supply unit is operating, the controller is configured to control the capacity of the heat source unit-side heat exchanger equipped to the heat source unit so that a high-pressure side pressure of the first refrigerant discharged from the air-conditioning compressor is within a predetermined range.

6. The combined hot water supply and air-conditioning device of claim 1, wherein
   the controller is further configured to calculate the heating capacity ratio.

7. The combined hot water supply and air-conditioning device of claim 1, wherein
   the controller is further configured to increase the capacity of the heat source unit-side heat exchanger as the heating operation capacity of the indoor units and the hot water supply unit increases.

8. The combined hot water supply and air-conditioning device of claim 1, wherein
the controller is further configured to detect an outside air wet-bulb temperature and to adjust the capacity of the heat source unit-side heat exchanger in response to the outside air wet-bulb temperature.

* * * * *